(12) United States Patent
Araújo et al.

(10) Patent No.: US 11,358,279 B2
(45) Date of Patent: Jun. 14, 2022

(54) METHOD AND ARRANGEMENT FOR REMOTE CONTROL OF AN ENVIRONMENT

(71) Applicant: Telefonaktiebolaget LM Ericsson (publ), Stockholm (SE)

(72) Inventors: José Araújo, Stockholm (SE); Tommy Falk, Spånga (SE); Lars Andersson, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/322,366

(22) PCT Filed: Aug. 4, 2016

(86) PCT No.: PCT/EP2016/068703
§ 371 (c)(1),
(2) Date: Jan. 31, 2019

(87) PCT Pub. No.: WO2018/024338
PCT Pub. Date: Feb. 8, 2018

(65) Prior Publication Data
US 2019/0184565 A1    Jun. 20, 2019

(51) Int. Cl.
*B25J 9/16*    (2006.01)
*G05B 19/418*    (2006.01)

(52) U.S. Cl.
CPC .............. *B25J 9/1689* (2013.01); *B25J 9/163* (2013.01); *G05B 19/4187* (2013.01); *G05B 19/41845* (2013.01); *G05B 2219/40151* (2013.01)

(58) Field of Classification Search
CPC ................................ G05B 15/02; B60R 25/24
USPC ....................................................... 700/65, 3
See application file for complete search history.

(56) References Cited

U.S. PATENT DOCUMENTS

| 6,144,884 A | 11/2000 | Niemeyer et al. |
| 2015/0120048 A1* | 4/2015 | Summer ................ B25J 9/1692 700/254 |

FOREIGN PATENT DOCUMENTS

JP    2003025259 A  *  1/2003

OTHER PUBLICATIONS

Handa, Remote operating method and remote operating system for robot (Machine translation), 2003 (Year: 2003).*

(Continued)

*Primary Examiner* — Emilio J Saavedra
(74) *Attorney, Agent, or Firm* — Withrow & Terranova, PLLC

(57) ABSTRACT

When a control message is determined and sent from a master system to a slave system, the control message is accompanied with a time stamp, indicative of the master model version of the environment which was applied when the control data was determined by the master system. When data, triggered by data provided from the environment to the slave system in the form of updated sensor data is provided from the slave system to the master system, also that data, indicative of an updated slave model version of the environment made by the slave system, is provided to the master system, together with a time stamp, indicative of when the update of the slave model version was made. By applying the suggested time stamp, a coordination of model versions can be obtained between the master system and the slave system.

18 Claims, 7 Drawing Sheets

(56) References Cited

OTHER PUBLICATIONS

Rosell et al., "Safe Teleoperation of a dual hand-arm robotic systems" ROBOT2013: First Iberian Robotics Conference. Advances in Intelligent Systems and Computing, vol. 253. pp. 615-630 (Year: 2013).*

Jing et al., "A Study of Teleoperation of fluid power system over internet" Proceedings of the 6th JFPS International Symposium of Fluid Power, TSUKUBA 2005, Nov. 7-10, 2005, pp. 208-213 (Year: 2005).*

Bo et al., "The Teleoperation Simulation System based on VR" 2014 International Conference on Virtual Reality and Visualization, IEEE Computer Society, pp. 7-11 (Year: 2014).*

Xu et al., "Model-Mediated Teleoperation: Toward Stable and Transparent Teleoperation Systems" EEE Access (vol. 4) Jan. 2016, pp. 425-449 (Year: 2016).*

Mitra, Probal, et al., "Model-mediated Telemanipulation," The International Journal of Robotics Research, vol. 27, No. 2, Feb. 2008, SAGE Publications, pp. 253-262.

Smisek, Jan, et al., "Naturally-Transitioning Rate-to-Force Controller Robust to Time Delay by Model-mediated Teleoperation," International Conference on Systems, Man, and Cybernetics, IEEE, 2015, pp. 3066-3071.

Willaert, B., et al., "Towards Multi-DOF model mediated teleoperation: Using vision to augment feedback," Proceedings of the IEEE International Workshop on Haptic Audio Visual Environments and Games (HAVE 2012), Munich, 2012, pp. 25-31.

Winck, Ryder C., et al., "Model-Mediated Teleoperation with Predictive Models and Relative Tracking," Proceedings of the ASME 2013 Dynamic Systems and Control Conference, DSCC2013, Oct. 21-23, 2013, Palo Alto, California, pp. 1-5.

Xu, Xiao, et al., "Model-Mediated Teleoperation: Toward Stable and Transparent Teleoperation Systems," IEEE Access, vol. 4, 2016, pp. 425-449.

Xu, Xiao, et al., "Point-cloud based Model-mediated Teleoperation," IEEE International Symposium on Haptic Audio Visual Environments and Games (HAVE), Istanbul, 2013, pp. 69-74.

International Search Report and Written Opinion for International Patent Application No. PCT/EP2016/068703, dated Apr. 13, 2017, 15 pages.

* cited by examiner

METHOD AND ARRANGEMENT FOR REMOTE CONTROL OF AN ENVIRONMENT

This application is a 35 U.S.C. § 371 national phase filing of International Application No. PCT/EP2016/068703, filed Aug. 4, 2016, the disclosure of which is incorporated herein by reference in its entirety.

TECHNICAL FIELD

The present disclosure relates to methods and systems for performing remote control of an environment from a master system via a slave system.

BACKGROUND

Model-mediated teleoperation becomes a reality in more and more situations, ranging from relatively simple controlling tasks, such as e.g. controlling an actuator, to more complex tasks, such as e.g. remote surgery. There are many model-mediated tele-operation use cases where a delay, typically in the order of 100 ms or more, introduced into the communication network, connecting a master, or operator, with a slave, or tele-operator, such as e.g. a robot, will have a negative impact on the feedback, typically referred to as closed loop haptic feedback, where haptic feedback, provided from the slave to the master, is responded to by an operator's reaction, which is "closing the loop" in the other direction.

Model-mediated teleoperation normally works well when the controlled environment can be considered to be more or less static. However, in situations where the environment is experiencing rapid changes, the operator may actually operate on an outdated model of the controlled environment. Even in situations where the mentioned model is continuously updated, transmission delay may make the model applied on the master side more or less outdated, which will result in a risk which becomes higher the more delay sensitive the controlled environment is.

U.S. Pat. No. 6,144,884 A, suggests a method for mitigating the impact of delay in a tele-operation system which is based on passivity tools, where the position and speed of master and slave devices are considered when striving to overcome the negative impacts of delay.

It is however a desire to further minimise the impact that delay may have on the controlled environment.

SUMMARY

It is an object of the present document to address, or alleviate, the problem described above.

According to one aspect a method executed at a slave system, connected to a master system, via a communication system, for reacting on an environment, controlled by the master system, is suggested. The method comprise: receiving a control message, initiated from the master system, where the control message comprise control data, associated with the environment and a time stamp, indicative of a first model version of the environment, on which the master system has based the received control data; initiating applying of the control data to a model version of the environment, where the model version is identified as a first model version of the environment, based on the time stamp, resulting in a first control output, and applying of the control data to a second model version of the environment, being the model version most recently used by the slave system, resulting in a second control output, and initiating a first reaction on the environment, according to the control data, in case a discrepancy between the first control output and the second control output is below a first threshold value, or initiating a second reaction on the environment, according to the control data in combination with rules applicable to the slave system, in case a discrepancy between the first control output and the second control output exceeds the first threshold value.

By applying the suggested method, the slave system will be able to apply appropriate a slave model version, based on which model version that has been used by the master system, so that the slave system will be able to react accordingly on the environment.

According to one embodiment, the model versions are acquired by initiating acquiring of the model version from a look-up table, accessible to the slave system, while according to another embodiment, the model versions are instead acquired by initiating computations involving backwards iterations on stored model versions.

The rules to be applied by the slave system may according to the circumstances state the slave system shall either adjust the control data based on the determined discrepancy, or prohibit execution of the control data, and indicate the prohibition of execution of the control data to the master system.

According to one embodiment, the rules are determined based instructions kept in a storage accessible to the slave system, while, according to another embodiment, instructions are transmitted to the slave system.

According to one embodiment, the slave system may be able to apply time stamps also in the other direction, so that, an updated slave model version will always result in a corresponding updating procedure also at the master system. In such a situation the mentioned method comprise the further steps of: initiating acquisition of sensor data associated with the environment; initiating a comparison between the acquired sensor data and previously acquired sensor data; initiating determination of an updated model version, based on the comparison; initiating determination of a time stamp indicative of when the model version was updated, and initiating transmission of data associated with the updated model version to the master system, together with the determined time stamp.

According to another aspect, a computer program for enabling a slave system to react on an environment when controlled from a master system via a communication system, is suggested, where the computer program comprises code means which when executed on the slave system causes the slave system to perform the method, executable on the slave system, according to any of the embodiments suggested above.

According to yet another aspect, a computer program product comprising computer readable medium and a computer program, such as the one mentioned above, is suggested.

According to yet another aspect a method executed at a master system, connected to a slave system via a communication system, for controlling an environment via the slave system, is suggested. The method executed at the master system comprising: initiating determination of control data, intended to control the environment, based on sensor data received from the slave system and an operator action applied on the latest available model version of the environment; initiating determination of a time stamp, indicative of said latest available model version of the environment, and initiating transmission, to the slave system, of a control message, comprising the determined control data, and the time stamp.

Typically, the mentioned rules are stored in a memory accessible to the master system, but, according to an alternative embodiment, such rules can be updatable, wherein the control message may further comprise such updated rules, to be applicable for the slave system.

The mentioned rules may indicate to the slave system that is shall either adjust the control data based on the determined discrepancy, or prohibit execution of the control data, and indicating the prohibition of execution of the control data to the master system.

If updated rules are applied, such rules can, according to one embodiment, be valid for the duration of a predetermined time interval, while, according to another embodiment, updated rules are valid until new updated rules, at least partly overriding the mentioned updated rules, are received by the slave system.

When considering communication from the slave system to the master system, the method suggested above, may comprise the further steps of receiving data associated with a model version, updated at the slave system, and an associated time stamp; initiating updating of a model version, based on the receive data and the associated time stamp, and initiating storage of the updated model version.

The data associated with the updated model version may comprise at least one of the sensor data associated with a controllable device and model parameters derived during the model version updating.

According to another aspect, a computer program for enabling a master system to control a slave system via a communication system, is suggested, where the computer program comprises code means which when executed on the master system causes the master system to perform the method, executed on the master system, according to any of the embodiments suggested above.

According to yet another aspect, a computer program product, comprising computer readable medium and a computer program, such as the one described above, with reference to the master system, is suggested.

According to another aspect, a slave system, connectable to a master system, via a communication system, for reacting on an environment when controlled by the master system, is suggested. The suggested system comprise a processor and a memory, comprising instructions, which when executed by the processor causes to slave system to: receive a control message, initiated from the master system, where the control message comprise control data, associated with the environment, and a time stamp, indicative of a first model version of the environment on which the master system has based the received control data; initiate applying of the control data to a model version of the environment, identified as a first model version of the environment, based on the time stamp, resulting in a first control output, and to a second model version of the environment, being the model version most recently used by the slave system, resulting in a second control output, and initiate a first reaction on the environment, according to the control data, in case a discrepancy between the first control output and the second control output is below a first threshold value, or initiate a second reaction on the environment, according to the control data in combination with rules applicable to the slave system, in case a discrepancy between the first control output and the second control output exceeds the first threshold value.

According to a first embodiment the memory of the slave system further comprises instructions, which when executed by the processor causes the slave system to acquire the model versions by initiating acquiring of the model version from a look-up table, accessible to the slave system, while, according to another embodiment the model versions are acquired by initiating computations involving backwards iterations on stored model versions.

The memory of the slave system further comprises instructions, which when executed by the processor causes the slave system to either apply rules specifying that the slave system shall initiate a reaction which involves initiating adjusting of the control data based on the determined discrepancy, or to prohibit execution of the control data, and transmit a message indicating the prohibition of execution of the control data to the master system.

The memory of the slave system further comprises instructions, which when executed by the processor causes the slave system to either acquire rules from a storage which is accessible to the slave system or to acquire rules from a message transmitted to the slave system.

In order for the slave system to be able to notify a master system of an executed model version updating procedure, the memory of the slave system further comprises instructions, which when executed by the processor causes the slave system to: initiate acquisition of sensor data associated with the environment; initiate a comparison between the acquired sensor data and previously acquired sensor data; initiate determination of an updated model version, based on the comparison; initiate determination of a time stamp representative of when the model version was updated, and initiate transmission of data associated with the updated version model to the master system, together with the determined time stamp.

According to another aspect, a slave system, connectable to a master system, via a communication system, for reacting on an environment when controlled by the master system, is suggested. Such a slave system comprise: a first communication module for receiving a control message, initiated from the master system, where the control message comprise control data, associated with the environment, and a time stamp, indicative of a first model version of the environment on which the master system has based the received control data; a first comparison module for initiating applying of the control data to a model version of the environment, identified as a first model version of the environment, based on the time stamp, resulting in a first control output, and to a second model version of the environment, being the model version most recently used by the slave system, resulting in a second control output, and a first actuation module for initiating a first reaction on the environment according to the control data, in case a discrepancy between the first control output and the second control output is below a first threshold value, or for initiating a second reaction on the environment, according to the control data in combination with rules applicable to the slave system, in case a discrepancy between the first control output and the second control output exceeds the first threshold value.

According to another aspect, a master system, connectable to a slave system via a communication system, for controlling an environment via the slave system, is suggested. The suggested master system comprises a processor and a memory, comprising instructions, which when executed by the processor causes the master system to: initiate determination of control data, intended to control the environment, based on sensor data received from the slave system and an operator action applied on the latest available model version of the environment, and initiate transmission, to the slave system, of a control message, comprising the determined control data, and a time stamp, indicative of said latest available model version of the environment.

According to one embodiment, the memory of the master system further comprises instructions, which when executed by the processor causes the master system to provide updated rules, applicable for the slave system in the control message.

The memory typically also comprises instructions, which when executed by the processor causes the master system to: generate and provide rules to the slave system wherein the rules are specifying that the slave system shall initiate a reaction which involves either adjusting the control data based on the determined discrepancy, or prohibiting execution of the control data, and indicating the prohibition of execution of the control data to the slave system.

In order to be able to handle time stamped data, provided from a slave system the memory of the master system typically also comprises instructions, which when executed by the processor causes the master system to: receive data associated with a model version, updated at the slave system, and an associated time stamp; initiate updating of a master model version, based on the receive data, and initiate storage of the updated model version into a storage accessible to the master system.

The memory of the master system also comprises instructions, which when executed by the processor causes the master system to update the master model version based on at least one of sensor data associated with a controllable device and model parameters provided in received data.

According to another aspect, a master system, connectable to a slave system via a communication system, for controlling an environment via the slave system is suggested. The suggested master system comprise: a controlling module for initiating determination of control data, intended to control the environment, based on sensor data received from the slave system by a first communication module and an operator action, applied on the latest available model version of the environment; a time stamp determining module for determining a time stamp, associated with said latest available model version of the environment, to the and a second communication module for initiating transmission to the slave system of a control message, comprising the determined control data and the time stamp.

BRIEF DESCRIPTION OF DRAWINGS

Embodiments will now be described in more detail in relation to the accompanying drawings, in which.

DETAILED DESCRIPTION

Briefly described, methods, are provided where negative effects caused by time delays between a master system and a slave system, forming a model-mediated teleoperation system, can be reduced. Furthermore, a master system and a slave system, which have been adapted so that they are capable of executing the suggested methods are also suggested.

More specifically, a technical solution is suggested where information which has been updated, either in the master system or in the slave system, is tagged with a time stamp, indicating when the update occurred, before the updated information is transmitted to the corresponding system. Thereby, upon receiving the time stamped information, the receiving system will be able to determine when the model version used by the transmitting system, was created/updated and to identify a relevant model version from a plurality of available model versions of the environment. More specifically, thanks to the time stamp provided in the received information, the model version of the environment used by the transmitting system can be identified also by the receiving system and proper actions can be taken, based on the determined model version. As will be described in further detail below, methods are suggested for applying the principle described above in both directions between a master system and a slave system.

Figure 1:
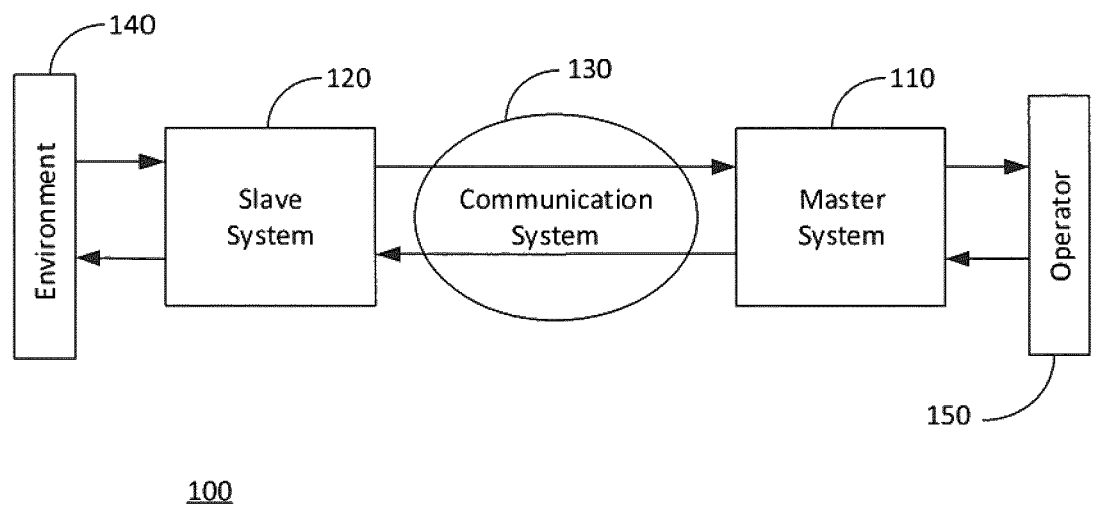
FIG. 1 is a simplified overview of a model-mediated teleoperation system, comprising a slave system interconnected with a master system via a communication system so that an operator can control one or more devices in an environment.

FIG. 1 is a schematic overview of a system, such as the one mentioned above, which can be referred to as a model-mediated teleoperation system. The system comprises a first system, referred to as a master system 110, under control of an operator 150, which could be a person, in case of manual operation, or e.g. a robot, in case of automated operation. The master system 110 comprises any type of suitable user interface which enables the operator 150 to control a second system, referred to as a slave system 120, via an interconnecting communication system 130, which may be based on a wireless network, such as e.g. a 3G, 4G/LTE, a satellite based network, or wire based communication network, such as e.g. Ethernet, or any other network, suitable for carrying out the suggested procedures. The master system 110 also comprises a computer (not shown) which is operating on one or more controllable devices (not shown), arranged in an environment, where all controllable devices and the part, or parts, of the surrounding environment which has been arranged so that it can be monitored via one or more sensors can be referred to as a model of the environment 140. More specifically, by model of an environment we here mean a model of the device/s, such as e.g. a robot, controllable by an operator, via the master system, and the relevant surroundings of the device/s, which may have relevant impact on the operation of the master system 110, and which can be monitored by applying one or more sensors in the environment. Consequently, a resulting model of an environment will to a large extend depend on the amount of, and selected layout of, sensors within the mentioned environment, as well as the capabilities of the sensors. Since both the master system and the slave system will update and store a respective, separate version of a model of the environment, we will from hereinafter refer to such models as a master model version and a slave model version, respectively.

It is to be understood that the technical solution suggested herein is focusing on the communication between the master and the slave system, irrespective of which type of communication that is used for interconnecting the two mentioned systems. Thereby any communication executed between the slave system and the environment, as well as between the master system and the operator, is out of scope of this document. More specifically, any type of sensors and actuators may be used in the environment for enabling control of controllable devices and monitoring of its surroundings, where communication of relevant data can be executed using any type of suitable means of communication and communication networks. Likewise, any type of operator interface, enabling manual, automated or a semi-automated operation of one or more controllable devices may be used, whereas any type of means of communication and communication network may be used for enabling interaction between the master system and the operator. Finally, any type of conventional functionality for handling commands of an operator by the master system may be applied by the master system.

The slave system 120 comprises means for providing communication with the communication system 130, as well as means for providing communication with the environment 140. The slave system 120 also comprises a computer (not shown) operating on the slave model version, where new versions are continuously updated by, and stored on, or with support from, the slave system 120. In its simplest embodiment the environment may comprise an actuator and a sensor, providing data associated with the location where a controllable device and its associated actuator/sensor is placed. A more complex embodiment may e.g. comprise a robot, including a camera, capable of registering the whereabouts as well as the surroundings of the robot and its operating area. Cameras suitable to be used for such a purpose include e.g. RGB, RGB-D and Infra Red (IR) cameras, while sensors to be used may include e.g. temperature sensors, force sensors, Light Detection and Ranging (LIDAR), point clouds and/or accelerometers. Naturally, a more complex environment will provide more information to the slave system 120, the master system 110 and the operator 150 on the surroundings of a controlled device, thereby improving the accuracy and reliability of the described controlling process. A more complex environment may result in a more complex slave model as well as a more complex master model. Generally, the mentioned models are built up based on input on the surroundings of the controllable device or devices, where such input typically is a reflection of the surrounding 3D space, which may include e.g. stationary objects, such as e.g. walls, floor, ceiling, doors, windows, as well as movable objects, such as e.g. falling rocks in a mine. The model versions may be based on geometrical parameters, indicating e.g. the shape, size, texture of objects and its surroundings, as well as physical parameters, indicating parameters such as e.g. friction, stiffness, temperature, elasticity of monitored objects and their surroundings.

Figure 2:
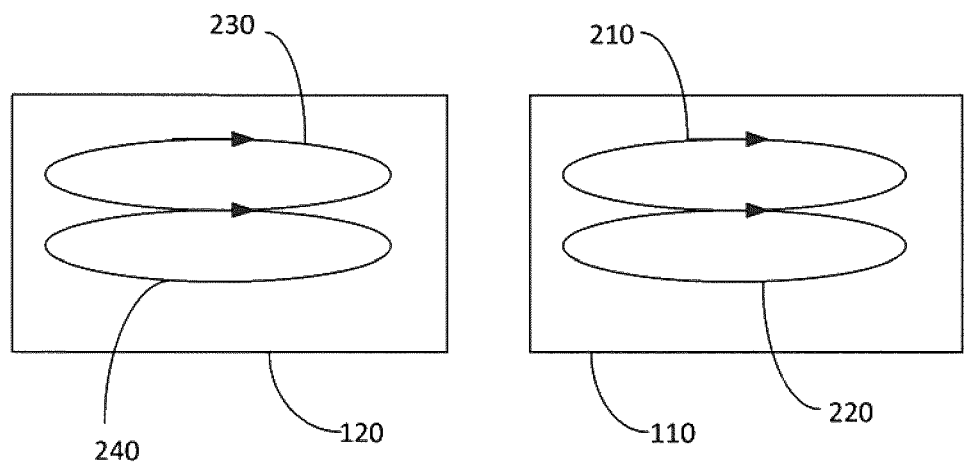
FIG. 2 is a simplified overview of the slave system and master system of FIG. 1

FIG. 2 is a schematic overview of the master system 110 and the slave system 120, described above, with reference to FIG. 1, where the master system 110 is expressed as comprising a haptic control loop, here referred to as a haptic master control loop 210, capable of controlling an environment, including one or more controllable devices, as described by the master model. The haptic master control loop 210 is configured to operate in cooperation with a model update loop, here referred to as a master model control loop 220, on a continuous basis, where the master model control loop 220 is capable of updating and maintaining relevant master model versions. Even though the master system 110 and the slave system 120 are presented as mutually isolated systems in FIG. 2, it is to be understood that, in normal operation, the two systems are connected in accordance with what was described above, with reference to FIG. 1. While the haptic master control loop 210 is handling input, from, and providing output to the operator 150, based on data provided from the slave system 120, the master model control loop 220, is interacting with the haptic master control loop 210 for generating and keeping updated master model versions of the environment 140. In a corresponding way, a haptic control loop, referred to as a haptic slave control loop 230 of the slave system 120 is interacting with another model update loop, referred to as a slave model update loop 240, wherein the haptic slave control loop 230 is handling input received from the master system 110, as commands on the environment 140, while the slave update loop 240 is continuously updating and storing slave model versions.

A main purpose with the methods as described herein can be described as coordinating the use of the model versions in the slave system and the master system, so that the master system and the slave system to the largest possible extent are operating on a corresponding environment. When the suggested mechanism is implemented, both the slave system and the master system are made aware of the corresponding systems knowledge of the environment, resulting in a safer and more efficient operation.

Figure 3:
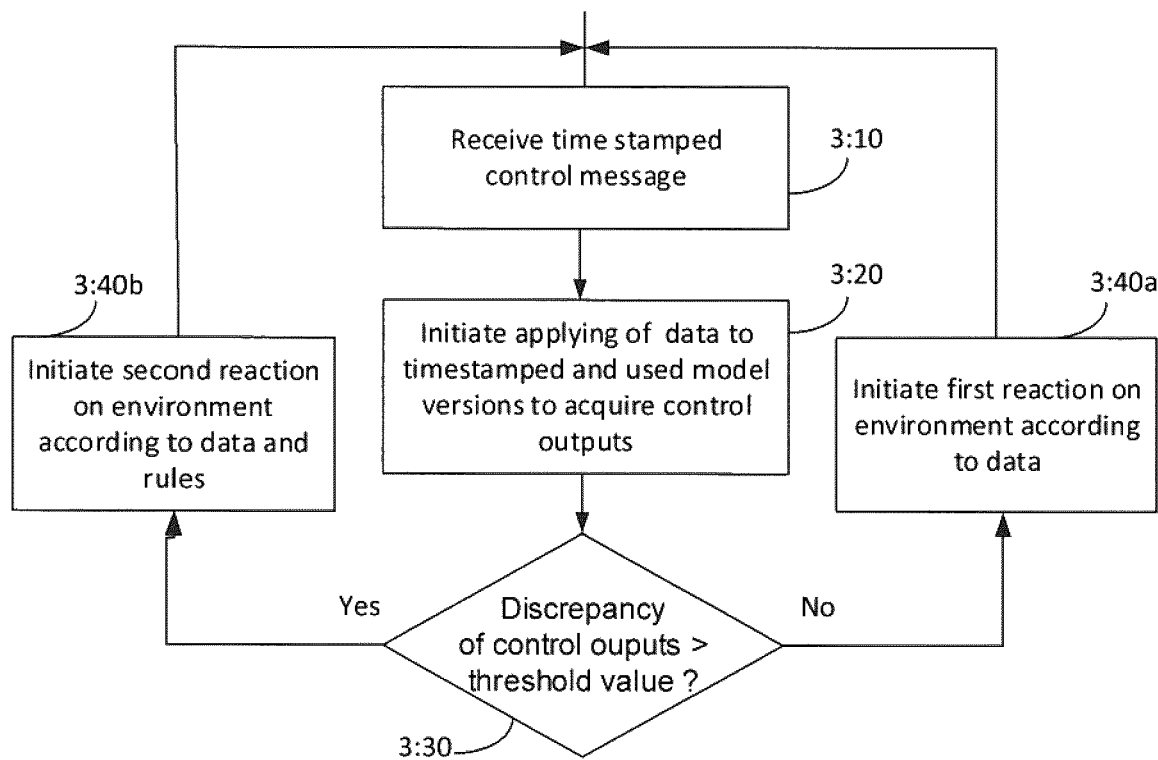
FIG. 3 is a flow chart, illustrating a controlling process executable in a slave system arranged according to FIGS. 1 and 2.

FIG. 3 is a flow chart, illustrating a method executable in a slave system, such as the haptic slave control loop described above, with reference to FIGS. 1 and 2, where a message, herein referred to as a control message, comprising data associated with the environment, as defined above, and a time stamp, is received from a master system in a first step 3:10. The control message comprises control data, defining a command, instructing the slave system to effectuate an activity on a controlled device e.g. which may have impact on e.g. one or more of position, angular speed, and force associated with the controlled device. In response to receiving such a control message, the received control data is applied to a first slave model version of the environment, identified by the time stamp, resulting in an output, here referred to as a first control output. Such a slave model version is available from storage at, or accessible to, the slave system. The received data is also applied to a second slave model version, being the slave model version which is most recently used by the slave system, which results in another control output, here referred to as a second control output. Thereby, the first control output is representing a potential activity on the environment, in response to the control data, when the control data is applied on the first slave model version, while the second control output is representing a potential activity on the environment, in response to the control data, when the control data is applied on the second slave model version.

As will be described in more detail below, time stamped slave model versions have been generated and stored by the slave model control loop and thereby made accessible to the haptic slave control loop. Applying the data to relevant model versions, as suggested above, is illustrated as a step 3:20 in FIG. 3. By applying data to a model version it is here meant that one or more parameters, constituting the control data, such as e.g. a force, is exerted on an object, having certain properties, such as e.g. certain stiffness properties, which are reflected in the respective model version. By way of example, based on a certain stiffness coefficient, the output force of contact has a certain value for a given input, provided in the control data, when e.g. a combination of a position, a speed and a force is applied on a surface of a controlled object of an environment by the slave system. Based on the position, velocity and force, a resulting output force on the mentioned surface is calculated, using the available model version. Thereby the position, velocity and force are the control inputs to be applied on the slave model version. The mentioned procedure can be executed according to any known controlling mechanism, and thus, further details are out of the scope of this document.

In a next step 3:30, the discrepancy between the two control outputs is determined and compared to a threshold value, indicating how tolerant the described system can be to changes to the slave model, without requiring any special measures to be applied when responding to a control message. In case the discrepancy exceeds the threshold value, the relevant model version, is considered to have been modified since the control message was generated at the master system to such an extent that special measures, specified by certain predefined rules, have to be followed rather than simply reacting on the environment, by executing a command according to the content of the control message, as indicated in a step 3:40b. Such a rule may e.g. be to refuse to execute the control message, due to a discrepancy, which is considered to be so high that reliable execution of the command cannot be allowed. Such a procedure may also involve the transmission of information, in the form of a warning message to the master system, for presentation to the operator, indicating the refusal of execution of the command. Alternatively, the information on the refusal of execution of the command is provided to the master system in the form of an instruction to the master system. The latter alternative is particularly relevant for a situation where at least the mentioned part of the processing in the master system is executed autonomously.

In case the situation is not considered to be that critical, rules may instead indicate to the slave system that the content of the control message is to be compensated for, taking the discrepancy into account in some specified manner, when reacting on the environment. The latter option will typically require more intelligence in the slave system, but will on the other hand provide a more fluid operation experience, avoiding sudden halts and disruptions. The former approach could e.g. be more suitable in scenarios where the environment is mostly static, and where it is a desire to keep the construction of the slave system fairly simple. The mentioned rules may be rules which have been configured at the slave system, e.g. at the time of installation of the system. Alternatively, one or more of the mentioned rules may be dynamically adaptable from the master system, e.g. such that one or more updated rules can be provided in a control message, such as the control message mentioned above, or in a separate message, transmitted to the slave system.

If instead the discrepancy is found to be below the specified threshold value, the slave system can react directly on the environment according to the data received in the control message, e.g. execute a command on the environment, according to the provided data, i.e. all according to conventional teleoperation controlling manners.

Alternatively, the level of change between the two slave model versions can be determined prior to executing step 3:20, so that, in case of no change at all between the two mentioned versions, or in case of only a minor change which is below a certain threshold value, it is determined that only the most recently used slave model version need to be considered when determining how the slave system is to react on the environment, i.e. that there is no need to calculate and consider the first control output. Obviously, the latter scenario will not include step 3:30 and will always result in that step 3:40a is executed.

Figure 4:
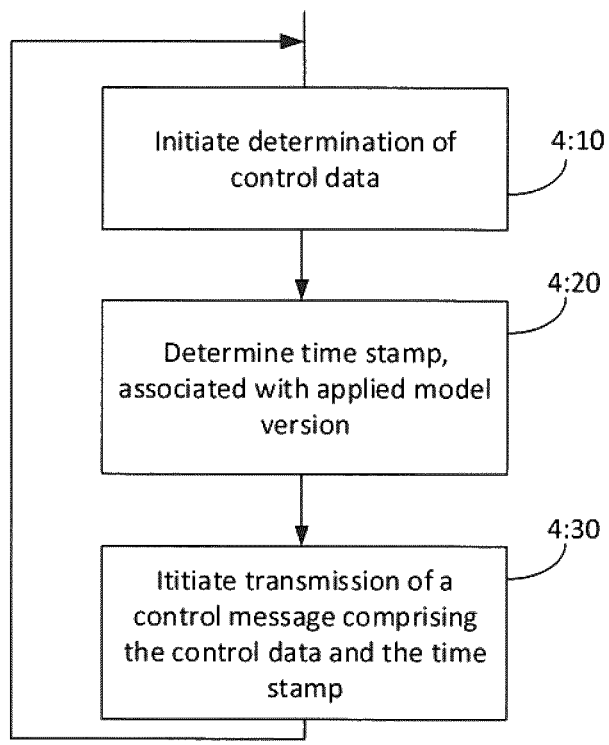
FIG. 4 is another flow chart, illustrating a controlling process executable in a master system arranged according to FIGS. 1 and 2.

FIG. 4 is another flow chart, describing a method executable in a master system, such as the haptic master control loop described above, with reference to FIG. 2. In a first step 4:10, control data is determined at the master system. Such data can be generated in a conventional manner, where data, provided from the respective master model version, is evaluated together with commands entered to the master system via a user interface by the operator. In a next step 4:20, a time stamp, indicative of the master model version which was applied by the master system when the control data was determined, is updated and in another step 3:40, the control data and the associated time stamp are transmitted to the slave system in a control message.

While a time stamp provided from the slave system to the master system is indicating when in time a slave model version was updated at the slave system, thereby allowing the master system to use the retrieved time stamp to find the corresponding, associated master slave version, the time stamp provided from the master system to the slave system is indicating which master model version that was used by the master system when the control data was determined. Consequently, a time stamp provided from the slave system is determined by generating the time stamp, while a time stamp provided from the master system is determined by the master system by identifying an already available time stamp which is associated with a master model version which has been used when determining the time stamped control data.

According to an alternative embodiment, the control message, or a separate message, also comprise updated rules to be applied by the slave system. Thereby, rules applicable by the slave system can be dynamically updated from the master system. In a corresponding way also one or more threshold values, applicable in the slave system, can be dynamically updated from the master system by providing one or more updated threshold values in a control message, or in a separate message, provided from, and/or initiated by the master system. According to one embodiment, the applicable rules may be valid at the slave system for a predetermined time interval, such as e.g. for the following 12 h, while, according to an alternative embodiment, an updated rule may instead be valid as long as it is not overridden by a new updated rule. Instead of only applying one threshold value at a slave system, a plurality of threshold values may be applied, and possibly also updatable by the master system, so that thereby a larger variety of options on how to handle a received control message can be applied at the slave system.

In addition to providing time stamped control data from the master system to the slave system, as has been described above, the slave system may also be adapted to provide time stamped data to the master system, thereby allowing also the master system to update its master model versions in a corresponding way. More specifically, such an option may be initiated by receiving data associated with a specific model version, which has been updated at the slave system, together with an associated time stamp, at the master system. In this case the time stamp will be indicative of when in time the respective slave model version was updated at the slave system. Upon receiving the mentioned time stamped data, the master system updates its master model version, based on the received data and the time stamp. As an alternative to reflecting changes to a controlled device, the mentioned data may comprise model parameters only, which are reflecting model parameter updates which have been made on the slave model version by the slave system, based on sensor data, received from the environment, by the slave system, in case the environment has changed but there is no sensor data originating from any change of a controlled device that need to be sent from the slave system to the master system. The mentioned data may also comprise a combination of both types of data.

Figure 5:
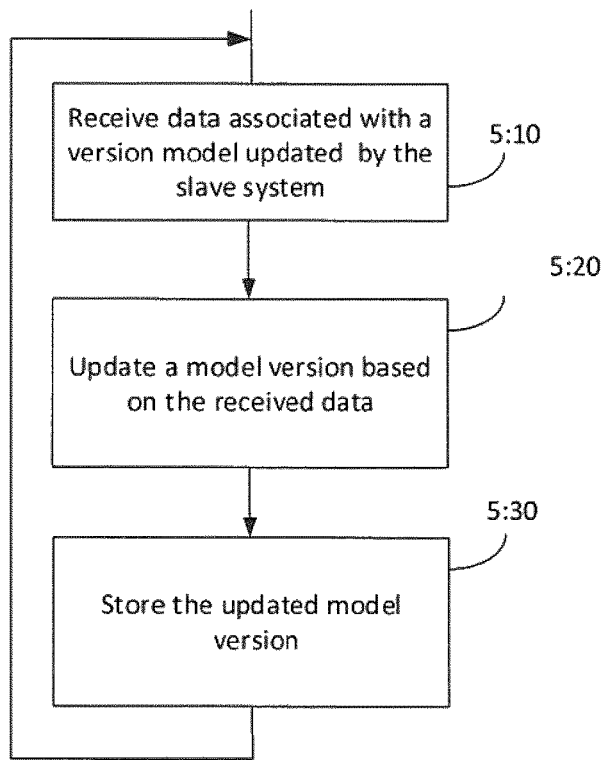
FIG. 5 is yet another flow chart, illustrating a model version updating process executable in a master system arranged according to FIGS. 1 and 2.

FIG. 5 is yet another flow chart, which is illustrating a method executable in the master system, which corresponds to the master model update loop mentioned above. As indicate in step 5:10, the master system is receiving data, which is associated with a model version, which has been updated by the slave system, together with an associated time stamp, indicating when in time the slave model version was updated by the slave system. More specifically, step 5:10 will occur each time the model has been updated at the slave system. In a next step 5:20, also the master system is updating the master model version, according to the received data and the associated time stamp, and in a final step 5:30, the updated, time stamped master model version is stored, so that it can be assessed and used by the haptic master control loop. As has already been mentioned above, various embodiments may be applied by the slave system, so that step 5:10 may be initiated based on changes in sensor data associated with a controlled device, changes in one or more model parameters, or a combination of both.

Figure 6:
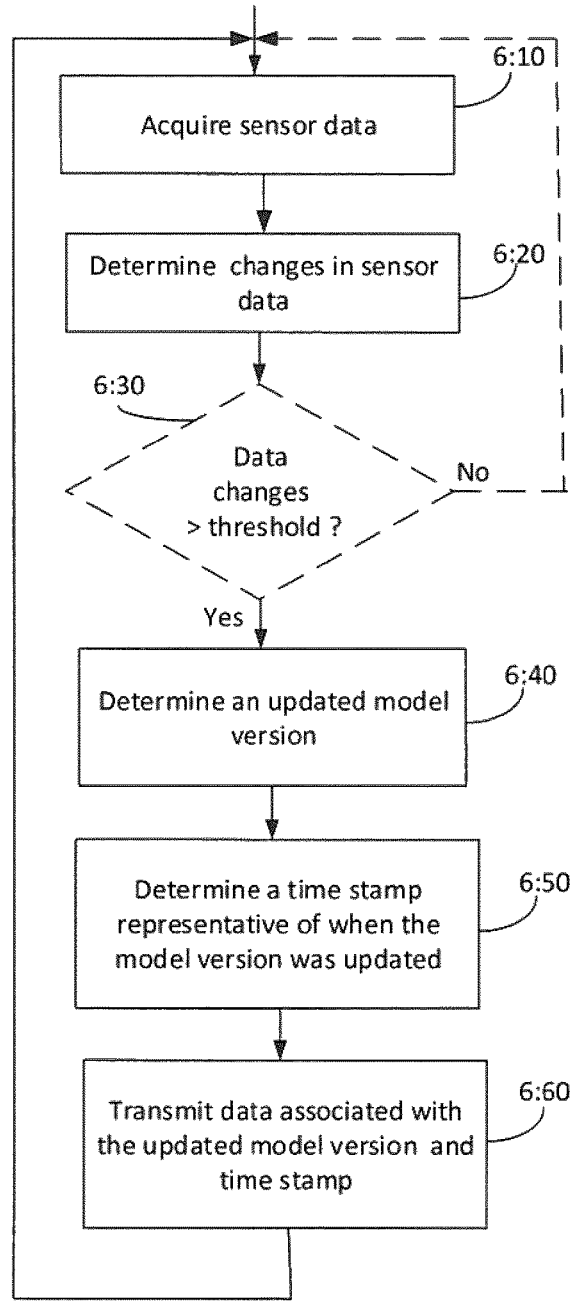
FIG. 6 is another flow chart, illustrating a model version updating process executable in a slave system arranged according to FIGS. 1 and 2.

FIG. 6 is yet another flow chart, illustrating a method executable in the slave system, which corresponds to the slave model update loop mentioned above. As indicated in step 6:10, sensor data is acquired from the environment. In steps 6:20/6:30, changes in the received sensor data compared to previously received sensor data is determined, and in case the changes exceeds a predefined threshold value, an updated slave model version is determined, based on the comparison, as indicated in step 6:40, followed by determining a time stamp representative of when the model version was updated, as indicated in a step 6:50. Alternatively, the mentioned process is executed each time a change of sensor data is detected, irrespective of the amount of change. In such a situation step 6:30 can be omitted, or, if applied, the threshold can be set to 0. The data is then transmitted to the master system, as indicated in step 6:60. If, on the other hand, the data changes do not exceed the threshold value, no update of the model version is required and the process starts again, awaiting new sensor data. In accordance with what has been mentioned above, for the master system, alternatively more than one threshold value may be applied at the slave system, if a plurality of alternative options is required. Furthermore, the mentioned data may comprise sensor data, model parameters or a combination of both. Even though each step described above, with reference to FIG. 3-6, have been described as being executed at the master system or slave system, respectively, it is to be understood that, alternatively, one or more of these steps may instead be initiated from the mentioned master system or slave system, while the respective process may actually be executed at a physical location, other than the mentioned master system or slave system, such as e.g. in one or more physical devices forming part of a cloud solution, which has been made available to the master system and/or the slave system.

Figure 7A:
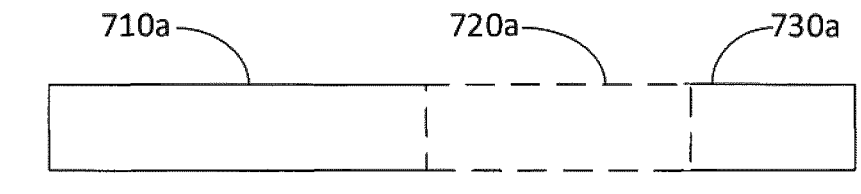
FIG. 7a is an illustration of a control message for transmission from a master system to a slave system.

A control message, transmitted from a master system to a slave system, is described in FIG. 7a, where the control message 700a comprises control data 710a, indicative of a command to be executed by the slave system on the environment. Optionally, the control message 700a also comprises updated information 720a which may comprise any of instructions, indicative of one or more updated rules, or one or more updated threshold values, alone or in a combination. In any event, the control message comprises a time stamp 730a.

Figure 7B:
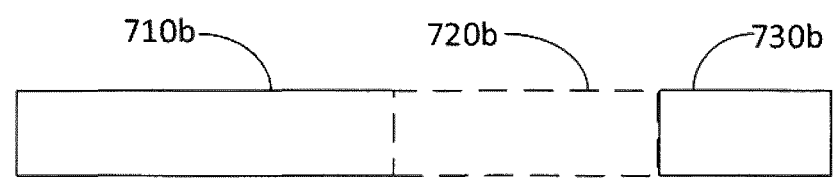
FIG. 7b is an illustration of message, for transmission from a slave system to a master system.

Model related data, which may alternatively be referred to as haptic data, transmitted from the slave system to the master system is described in FIG. 7b, where this message 700b, comprises model related data 710b associated with the environment, which data can comprise sensor data, indicative of changes made to a controlled device of the environment, one or more model parameters, indicative of a change of the surroundings of a controlled device, or a combination of both. The mentioned data 710b may comprise data captured by one or more sensors arranged in association with a controlled device in the environment, or model parameters, resulting from a slave model version, updated by the slave system, based on sensor data which is not associated with a controlled device, provided to the slave system from the environment, or a combination of both. In case of a denial of a command received by the slave system in a control message, message 700b may also comprise information 720b, forming a warning message or corresponding instructions, intended for the master system. In any event the message 700b also comprises a time stamp 730b

A slave system, capable of executing the methods described above, with reference to FIGS. 3 and 6, will now be described with reference to FIG. 8. The slave system 800, is connectable to a master system, as described above, via a suitable communication system, so that it is capable of reacting on an environment, or more specifically on one or more controllable devices, located in an environment, in response to control messages, received from the master system. In the other direction, the one or more controllable devices are configured to deliver sensor data, captured via one or more sensors, to the slave system 800 where the slave system 800 is also provided with data representative of the present state of relevant aspects of the environment, via one or more other sensors.

Figure 8:
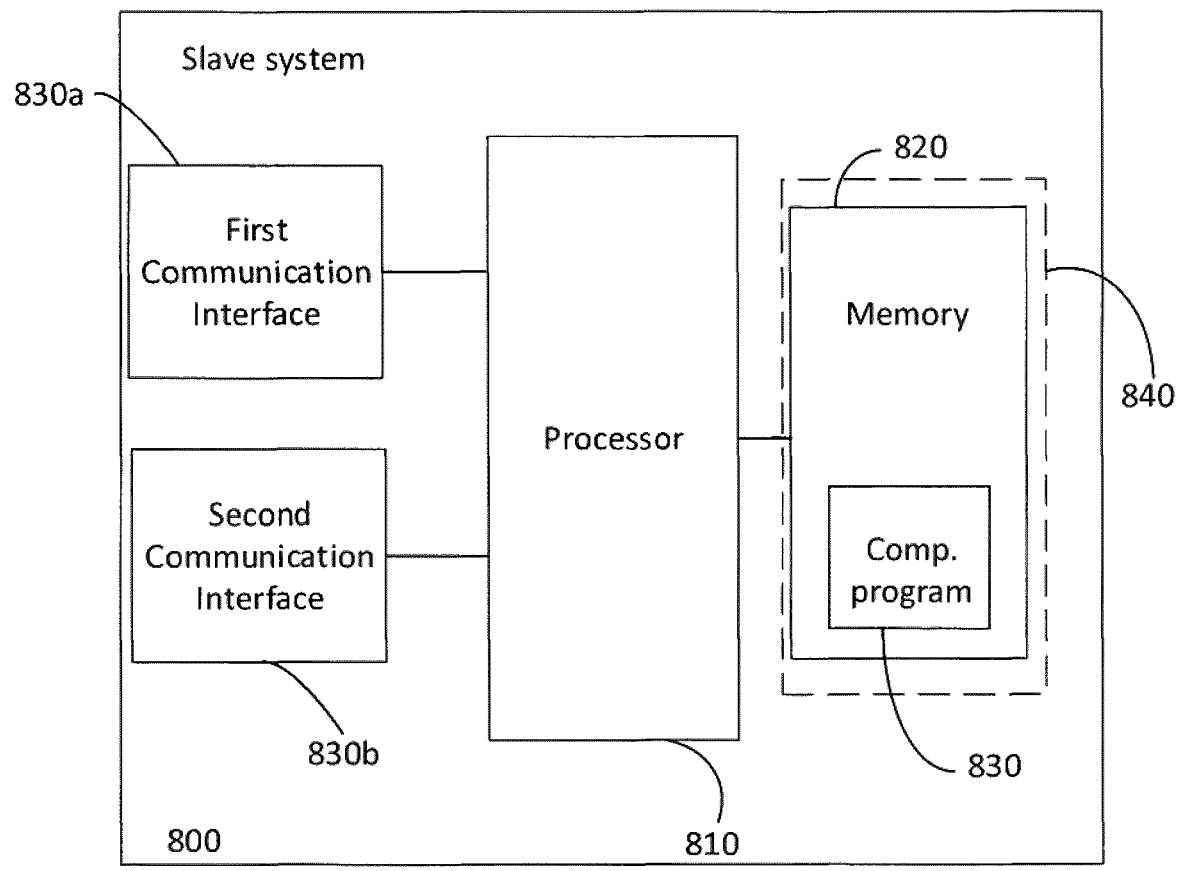
FIG. 8 is an illustration of a slave system according to a first embodiment.

The slave system 800 of FIG. 8 comprises a processor 810 and a memory 820, where the memory 820 is capable of storing executable instructions, in the form of a computer program 830, which when executed by the processor 810 causes the slave system 800 to execute a process, starting with receiving a control message, initiated from the master system, where the control message comprises data, associated with the environment, and a time stamp, where the time stamp is indicative of a slave model version, referred to as a first model version, of the environment on which the master system has based the received data. The slave system 800 is capable of receiving the mentioned control message via a communication interface, here referred to as a first communication interface 830a, which is connected to the processor 810. The processor 810 is provided using any combination of one or more of a suitable central processing unit (CPU), multiprocessor, microcontroller, digital signal processor (DSP) or application specific integrated circuit, capable of executing software instructions stored in a memory. The memory 820 can be any combination of read-and-write memory (RAM) and read-only-memory (ROM) and typically also comprises persistent storage, which, for example, can be any single one or combination of magnetic memory, optical memory, solid state memory or even remotely mounted memory.

The slave system 800 is capable of applying the received data to a model version of the environment, identified as a first model version of the environment, based on the time stamp, resulting in a first control output, and to a second model version of the environment, where the second model version is the model version most recently used by the slave system 800, resulting in a second control output. The slave system 800 is capable of determining the discrepancy between the two control outputs, and, in case a discrepancy between the first control output and the second control output is below a first threshold value, the slave system 800 is capable of initiating a first reaction on the environment, according to the received data, while in case a discrepancy between the first control output and the second control output exceeds the first threshold value, the slave system 800 is instead capable of initiating a second, conditional reaction on the environment, according to the received data in combination with rules, applicable to the slave system 800.

Alternatively, the level of change between the two slave model versions can be determined prior to determining any control outputs, wherein the slave system is configured to determine the level of change between the two slave model versions, so that in case of no change at all between the two mentioned versions, or in case of only a minor change which is below a certain threshold value, slave system is configured to only consider the most recently used slave model version when determining how to react on the environment, i.e. it is determined by the slave system that there is no need to calculate and consider the first control output. Obviously, the latter scenario will not include the mentioned discrepancy check and will always result in that the reaction, referred to as the first reaction above, is executed.

The mentioned model versions can be acquired by the slave system 800 by applying any method which is capable of acquiring a presently used model version, as well as previously used model versions. According to a first embodiment, the slave system 800 is capable of acquiring the model version from a look-up table, accessible to in the slave system 800. According to another embodiment, the slave system 800 is instead capable of initiating computations involving backwards iterations on stored model versions.

Various rules can be applied, enabling various considerations to be taken and various actions to be initiated by the slave system 800. According to one embodiment, the slave system 800 is capable of adjusting the received data, based on the determined discrepancy, according to a predefined rule, while, according to another embodiment, rules state that execution of the control data, or more specifically, of a command according to the control data, shall be prohibited. In the latter case, the slave system 800 is also capable of indicating the decision to prohibit execution to the master system, typically by transmitting a message dedicated for that purpose to the master system. The mentioned discrepancy, may be caused e.g. by an object, such as e.g. a fallen rock in a mine, which does suddenly appear in the environment, or by a stiffness coefficient of an object, which has been updated in a slave model version by the slave system, while this coefficient, until now, has been considered by the master system to be much harder than what was determined in the latest slave system update.

Typically, the slave system 800 is capable of acquiring applicable rules from a storage, which is either located at the slave system 800 or which is accessible to the slave system 800 from another location. Appropriate rules may e.g. be configured to the slave system 800 upon implementation of the system and may be dynamically updatable. In the latter case, the slave system 800 is, according to one embodiment, capable of providing additional information into the mentioned control message, such as instructions, where the additional information is specifying updated rules to be applied by the save system 800.

A slave system 800, such as the one described above, is capable of handling a time stamped control message, received from a master system, such as the one described above. In addition, the suggested slave system 800 is capable of enabling coordination of model versions also in the other direction. The slave system 800 is therefore also capable of initiating acquisition of sensor data, associated with the environment, which sensor data may include data indicative of a controlled device and/or data which is not associated with any of the controlled devices, but still relevant for the presently used model version. The slave system 800 is capable of making use of the acquired sensor data for determining the change of the respective sensor data, by comparing this data with previously acquired sensor data. The slave system 800 is also capable of determining how to update the model version, based on the comparison. The slave system 800 may, according to one embodiment, be capable of executing the mentioned model version updates unconditionally, i.e. each time sensor data is provided to the slave system 800 from the environment, or it can, according to a second embodiment, be configured to execute an update only in case the difference stated in the mentioned comparison exceeds a certain threshold value, which is applicable for the updating procedure. Such a threshold may e.g. be set to a change of 5%. Once an updated model version has been determined, the slave system 800 is capable of determining a time stamp, which is indicative of when the model version was updated, and of transmitting data, associated with the updated model version, to the master system, together with the determined time stamp. Thereby the master system will be able to make use of the acquired information for updating a corresponding model version. The mentioned transmission can, according to one embodiment, be executed via a second communication interface 830b, connected to the processor 810, or via the first communication interface 830a.

According to another aspect, a computer program 830 is provided, which comprises executable, computer readable code, which, when executed on a slave system, such as e.g. the one described above, causes the slave system 800 to perform a method according to any the methods described above, with reference to FIG. 3 or 6.

According to yet another embodiment, a computer program product 840 is provided, which comprises computer readable medium and a computer program 830, such as the one mentioned above. The computer program product 840 comprises a memory, which can be any combination of read-and-write memory (RAM) and read-only-memory (ROM). The memory typically also comprises persistent storage, which, e.g. can comprise any single one of, or a combination of magnetic memory, optical memory, solid state memory or even remotely mounted memory. Optionally, the computer program product 840, can form part of the previously mentioned memory 820.

According to another aspect, a slave system, capable of executing the same methods as has been described for the slave system described above, with reference to FIG. 8 can be configured as will now be described with reference to FIG. 9. The configuration according to FIG. 9 comprises a plurality of modules which are capable of interacting with each other. Alternatively, instead of being configured as software related modules, one or more of the mentioned modules may instead be configured as a corresponding hardware related unit, e.g. in the form of an Application Specific Integrated Circuit (ASIC).

Figure 9:
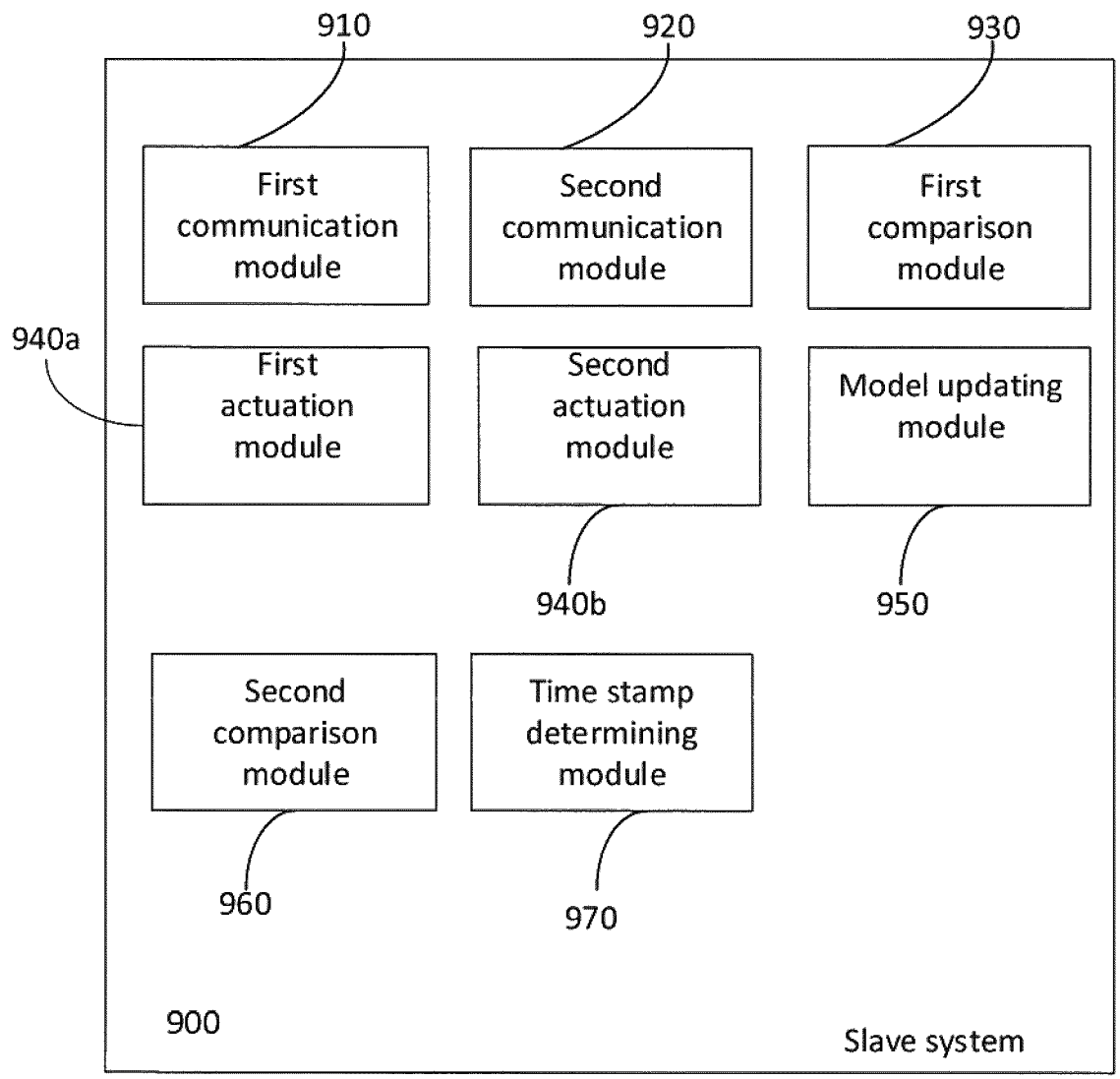
FIG. 9 is another illustration of a slave system according to a second embodiment.

The slave system 900 of FIG. 9 comprises a communication module, here referred to as a first communication module 910, which is capable of executing a step which corresponds to step 3:10 in FIG. 3. The slave system 900 also comprises a comparison module, here referred to as a first comparison module 930, which is capable of executing a step which corresponds to step 3:20 and step 3:30 of FIG. 3. Furthermore, the slave system 900 comprise a first actuation module 940a, capable of executing a step which corresponds to step 4:20a of FIG. 3, while a second actuation module 940b is capable of executing a step which corresponds to step 3:40b of FIG. 3. Module 940a and 940b are configured to interact with the environment via a communication module, such as e.g. the second communication module 920. Alternatively, the comparison module may be configured to initially determine the level of change between the two slave model versions, so that, in case of no change, or only a minor change, only the most recently used slave model version need to be considered for determining how to react on the environment, without requiring the comparison procedure mentioned above to be executed.

The slave system 900 of FIG. 9 is also capable of performing necessary model version updates, and to provide information relevant for such an update to the master system, as described with the method of FIG. 6. More specifically, the slave system 900 is configured to execute a step which corresponds to step 6:10 of FIG. 6, by acquiring sensor data via second communication module 920, while steps corresponding to step 6:20, and also step 6:30 if applicable, of FIG. 6 can be executed by second comparison module 960. Furthermore, a step corresponding to step 6:40 of FIG. 6 can be executed by a module referred to as a second comparison module 960, while a step corresponding to step 9:50 of FIG. 6 can be executed by a module referred to as time stamp determining module 970. A step corresponding to step 6:60 of FIG. 6 can be executed by the first communication module 910.

Figure 10:
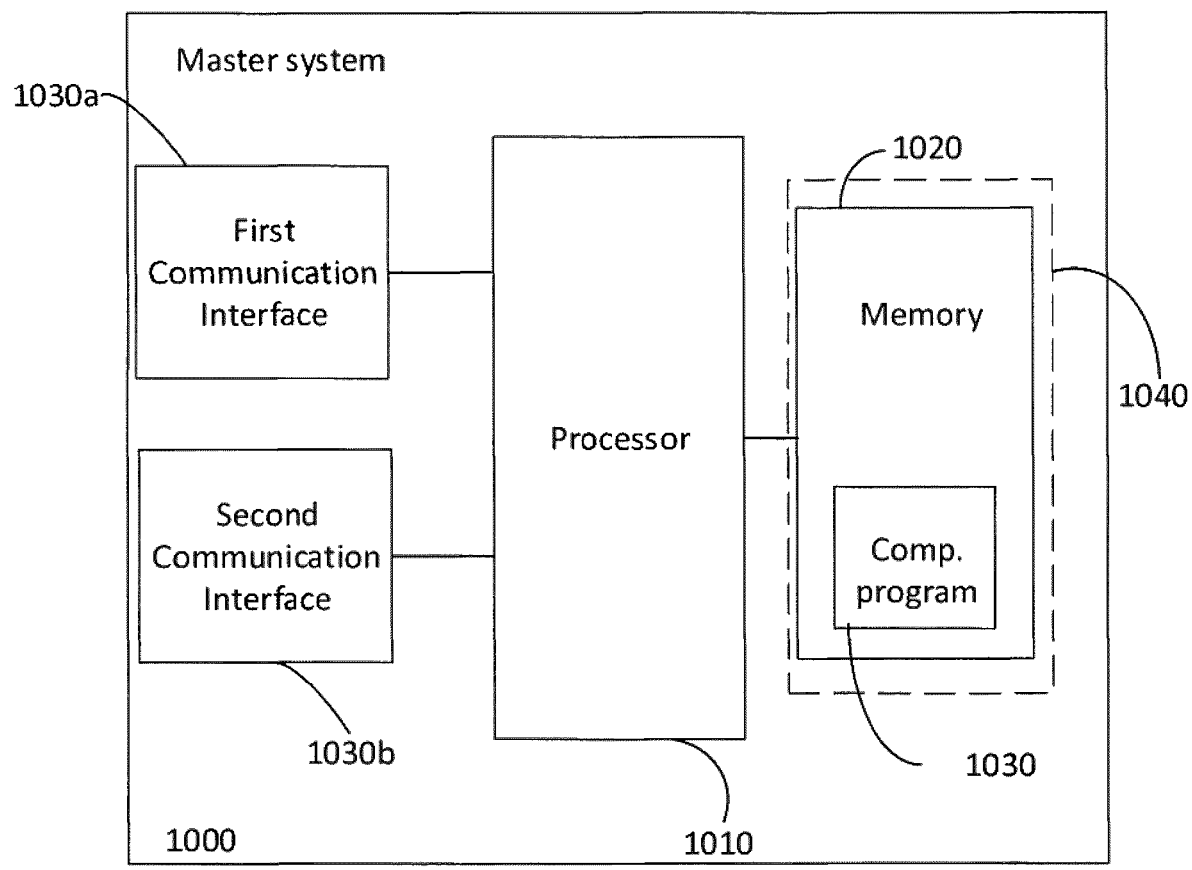
FIG. 10 is an illustration of a master system according to a first embodiment.

A master system capable of executing the methods described above, with reference to FIGS. 4 and 5, will now be described with reference to FIG. 10. The master system 1000 is connectable to a slave system, such as the one described above, via a communication system, and is capable of controlling an environment, which includes one or more controllable devices. The master system 1000 comprise a processor 1010 and a memory 1020. The processor 1010 is provided using any combination of one or more of a suitable central processing unit (CPU), multiprocessor, microcontroller, digital signal processor (DSP) or application specific integrated circuit, capable of executing software instructions stored in a memory. The memory 1020 can be any combination of read-and-write memory (RAM) and read-only-memory (ROM) and typically also comprises persistent storage, which, for example, can be any single one or combination of magnetic memory, optical memory, solid state memory or even remotely mounted memory. The memory 1020 comprise instructions, which when executed by the processor 1010 causes the master system 1000 to: initiate determination of control data, intended to control a controllable device of the environment, based on sensor data received from the slave system and an operator action applied on the latest available model version of the environment; initiate determination of a time stamp, associated with said latest available model version of the environment, and initiate transmission, to the slave system, of a control message, comprising the determined control data and the time stamp. According to one embodiment, rules applicable on the slave system may be updatable from the master system 1000, where the master system 1000 is capable of provide such updated rule in a control message.

Various types of rules may be provided from the master system 1000, including rules specifying that the data provided from the master system to the slave system shall be adjusted, based on the determined discrepancy, and rules prohibiting execution of the data, and indicating the prohibition of execution of the control data to the slave system. The mentioned indication may, according to one embodiment, be arranged as a warning message for presentation to an operator, while, according to another embodiment, the indication may instead be arranged as instructions, instructing the master system of the prohibited execution. The master system 1000 is also configured to update its model version in response to receiving data, indicating that the corresponding model version has been updated in the slave system. More specifically, the master system 1000 is capable of receiving data associated with a model version, which has been updated at the slave system and to respond to such data by updating the master model version, based on the received data and to store the updated master model version into a storage, which is accessible to the master system 1000. The master system 1000 is capable of initiating updating of the master model version based on data comprising: sensor data, indicative of a change to a controlled device, model parameters, indicative of a change to the environment, surrounding a controlled device, or a combination of both. According to another aspect, a computer program 1030 is provided, where the computer program 1030 comprises code means which when executed on the master system 1000 causes the master system 1000 to perform the method according to any of FIG. 4 or 5.

According to yet another aspect, a computer program product 1040, comprising computer readable medium and the mentioned computer program 1030 is provided. The computer program product 1040 comprises a memory, which can be any combination of read-and-write memory (RAM) and read-only-memory (ROM). The memory typically also comprises persistent storage, which, e.g. can comprise any single one or combination of magnetic memory, optical memory, solid state memory or even remotely mounted memory. Optionally, the computer program product 1040, can form part of the previously mentioned memory 1020.

Figure 11:
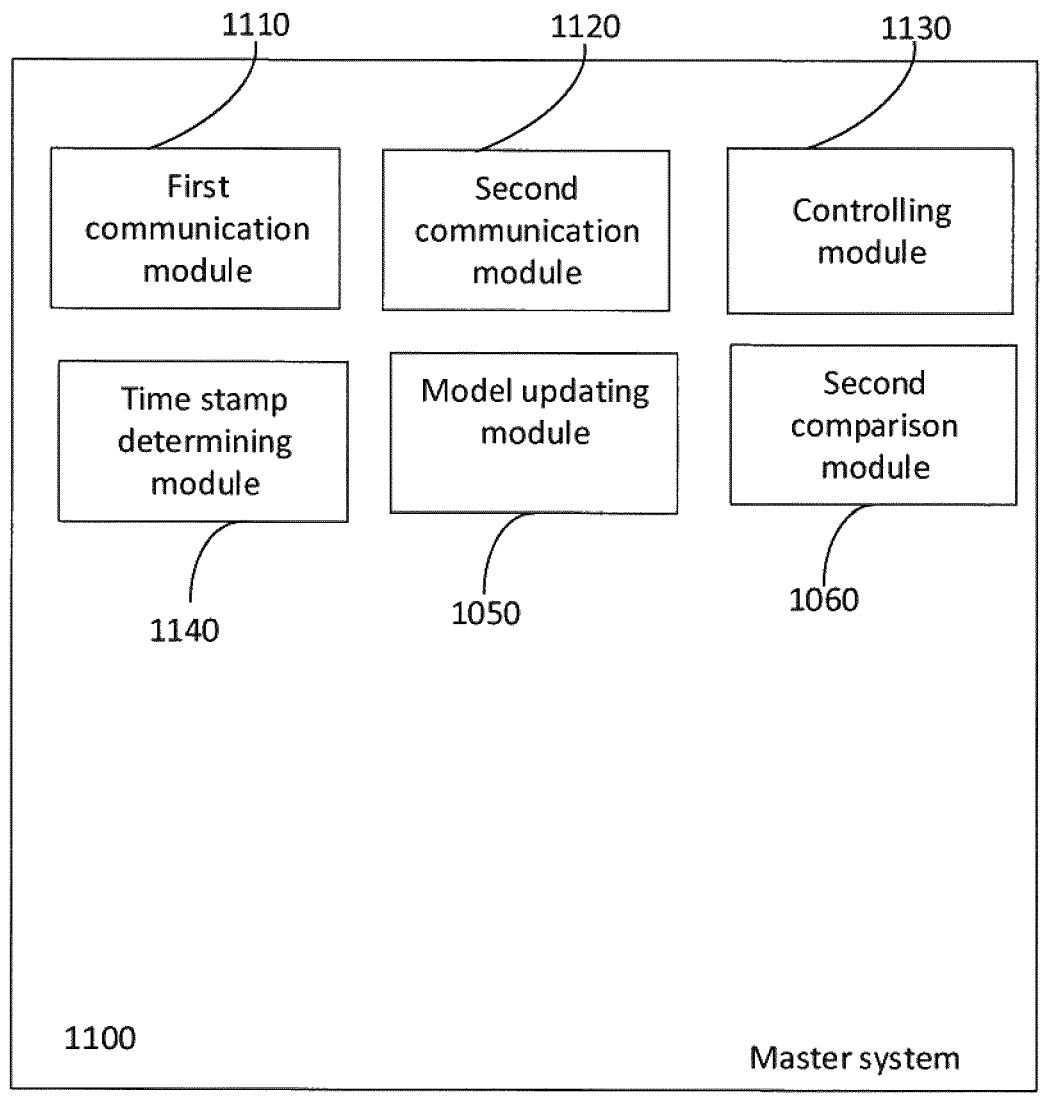
FIG. 11 is another illustration of a master system according to a second embodiment.

According to another aspect, a master system, capable of executing the same methods as has been described above for the slave system, with reference to FIG. 10 can be configured as will now be described below with reference to FIG. 11. The configuration according to FIG. 11 comprises a plurality of modules which are capable of interacting with each other. Alternatively, instead of being configured as software related modules one or more of the mentioned modules may instead be configured as a corresponding hardware related unit, e.g. in the form of an Application Specific Integrated Circuit (ASIC). The master system 1100 comprises a controlling module 1130 for initiating determination of control data, intended to control a controllable device of the environment, based on sensor data received from the slave system by a first communication module (1110) and an operator action applied on the latest available master model version, corresponding to step 4:10 of FIG. 4. A time stamp determining module 1140 is capable of determining a time stamp, associated with the latest available master model version, while a second communication module 1120 is capable of transmitting a control message, comprising the determined control data and the associated time stamp to the slave system. Even though the master system and the slave system as described above have been described as being executed at the master system or slave system, respectively, it is to be understood that, alternatively, one or more of the mentioned functionality may instead be initiated from the mentioned master system or slave system, while the respective process is actually executed at a physical location, other than the mentioned master system or slave system, such as e.g. in one or more physical devices forming part of a cloud solution, which has been made available to the slave system and/or master system.

The invention claimed is:

1. A method executed at a slave system, connected to a master system, via a communication system, for reacting on an environment, controlled by the master system, the method comprising:
receiving a control message, initiated from the master system, the control message comprising control data, associated with the environment, the control message further comprising a time stamp, indicative of a first master model version of the environment on which the master system has based the received control data;
initiating applying of the control data to a slave model version of the environment identified as a first slave model version of the environment, based on the time stamp, resulting in a first control output, and to a second slave model version of the environment, being the slave model version most recently used by the slave system, resulting in a second control output, wherein the first master model version and the first and second slave model versions each comprise a model version of at least one controllable device, controllable from the master system, and a model version of surroundings of the at least one controllable device, the model version of surroundings comprising one or more of a model of a stationary object in a surrounding three-dimensional (3D) space, a model of a moving object in the surrounding 3D space, a geometrical parameter of an object in the surrounding 3D space, and a physical parameter of an object in the surrounding 3D space; and
initiating a first reaction on the environment according to the control data, in case a discrepancy between the first control output and the second control output is below a first threshold value, or
initiating a second reaction on the environment, according to the control data in combination with rules applicable to the slave system, in case a discrepancy between the first control output and the second control output exceeds the first threshold value.

2. The method according to claim 1, wherein the first and second slave model versions are acquired by initiating:
acquiring of the first and second slave model versions from a look-up table, accessible to the slave system, or computations involving backwards iterations on stored slave model versions.

3. The method according to claim 1, wherein the rules applicable to the slave system specify that the slave system shall initiate a reaction involves:
adjusting the control data based on a determined discrepancy, or
prohibit execution of the control data, and indicating the prohibition of execution of the control data to the master system.

4. The method according to claim 1, wherein the rules are determined based on:
instructions kept in a storage accessible to the slave system, or
instructions transmitted to the slave system.

5. A method executed at a master system, connected to a slave system via a communication system, for controlling an environment via the slave system, the method comprising:
initiating determination of control data, intended to control the environment, based on sensor data received from the slave system and an operator action applied on a latest available master model version of the environment,
initiating determination of a time stamp, indicative of said latest available master model version of the environment, wherein the master model version is a model version of at least one controllable device, controllable at the slave system from the master system, and a model version of surroundings of the at least one controllable device, the model version of surroundings comprising one or more of a model of a stationary object in a surrounding three-dimensional (3D) space, a model of a moving object in the surrounding 3D space, a geometrical parameter of an object in the surrounding 3D space, and a physical parameter of an object in the surrounding 3D space; and
initiating transmission, to the slave system, of a control message, comprising the determined control data, and the time stamp.

6. The method according to claim 5, wherein the control message further comprises updated rules, applicable for the slave system.

7. The method according to claim 6, wherein the updated rules applicable for the slave system involve:
adjusting the control data based on a determined discrepancy, or
prohibit execution of the control data, and indicating the prohibition of execution of the control data to the master system.

8. The method according to claim 7, wherein the updated rules are valid for at least one of:
a predetermined time interval, or
until new updated rules, at least partly overriding the mentioned updated rules, are received.

9. A slave system, connectable to a master system, via a communication system, for reacting on an environment when controlled by the master system, the slave system comprising a processor and a memory, comprising instructions, which when executed by the processor causes the slave system to:
receive a control message, initiated from the master system, the control message comprising control data, associated with the environment, the control message further comprising a time stamp, indicative of a first master model version of the environment on which the master system has based the received control data;

initiate applying of the control data to a slave model version of the environment identified as a first slave model version of the environment, based on the time stamp, resulting in a first control output, and to a second slave model version of the environment, being a slave model version most recently used by the slave system, resulting in a second control output, wherein the first master model version and the first and second slave model versions each comprise a model version of at least one controllable device, controllable from the master system, and a model version of surroundings of the at least one controllable device, the model version of surroundings comprising one or more of a model of a stationary object in a surrounding three-dimensional (3D) space, a model of a moving object in the surrounding 3D space, a geometrical parameter of an object in the surrounding 3D space, and a physical parameter of an object in the surrounding 3D space; and initiate a first reaction on the environment according to the control data, in case a discrepancy between the first control output and the second control output is below a first threshold value, or initiate a second reaction on the environment, according to the control data in combination with rules applicable to the slave system, in case a discrepancy between the first control output and the second control output exceeds the first threshold value.

10. The slave system according to claim 9, wherein the memory further comprises instructions, which when executed by the processor causes the slave system to acquire the first and second slave model versions by initiating: acquiring of the first and second slave model versions from a look-up table, accessible to the slave system, or computations involving backwards iterations on stored slave model versions.

11. The slave system according to claim 9 wherein the memory further comprises instructions, which when executed by the processor causes the slave system to apply rules specifying that the slave system shall initiate a reaction which involves initiating: adjusting of the control data based on the determined discrepancy or prohibition of execution of the control data, and transmission of a message indicating the prohibition of execution of the control data to the master system.

12. The slave system according to claim 9, wherein the memory further comprises instructions, which when executed by the processor causes the slave system to acquire rules from a storage which is accessible to the slave system or to acquire rules from a message transmitted to the slave system.

13. The slave system according to claim 9, wherein the memory further comprises instructions, which when executed by the processor causes the slave system to: initiate acquisition of sensor data associated with the environment; initiate a comparison between the acquired sensor data and previously acquired sensor data; initiate determination of an updated slave model version, based on the comparison; initiate determination of a time stamp representative of when the slave model version was updated, and initiate transmission of data associated with the updated slave version model to the master system together with the determined time stamp.

14. A master system, connectable to a slave system via a communication system, for controlling an environment via the slave system, the master system comprising a processor and a memory, comprising instructions, which when executed by the processor causes the master system to:
    initiate determination of control data, intended to control the environment, based on sensor data received from the slave system and an operator action applied on a latest available master model version of the environment;
    initiate determination of a time stamp, indicative of said latest available master model version of the environment, wherein the master model version is a model version of at least one controllable device, controllable at the slave system from the master system, and a model version of surroundings of the at least one controllable device, the model version of surroundings comprising one or more of a model of a stationary object in a surrounding three-dimensional (3D) space, a model of a moving object in the surrounding 3D space, a geometrical parameter of an object in the surrounding 3D space, and a physical parameter of an object in the surrounding 3D space; and
    initiate transmission, to the slave system, of a control message, comprising the determined control data, and the time stamp, indicative of said latest available master model version of the environment.

15. The master system according to claim 14, wherein the memory further comprises instructions, which when executed by the processor causes the master system to provide updated rules, applicable for the slave system in the control message.

16. The master system according to claim 14, wherein the memory further comprises instructions, which when executed by the processor causes the master system to: generate and provide rules to the slave system wherein the rules are specifying that the slave system shall initiate a reaction which involves: adjusting the control data based on a determined discrepancy, or prohibiting execution of the control data, and indicating the prohibition of execution of the control data to the master system.

17. The master system according to claim 14, wherein the memory further comprises instructions, which when executed by the processor causes the master system to: receive data associated with a slave model version, updated at the slave system, and an associated time stamp; initiate updating of the master model version, based on the receive data, and initiate storage of the updated master model version into a storage accessible to the master system.

18. The master system according to claim 17, wherein the memory further comprises instructions, which when executed by the processor causes the master system to update the master model version based on at least one of sensor data associated with the at least one controllable device and model parameters provided in the received data.

\* \* \* \* \*